Figures 1, 2:
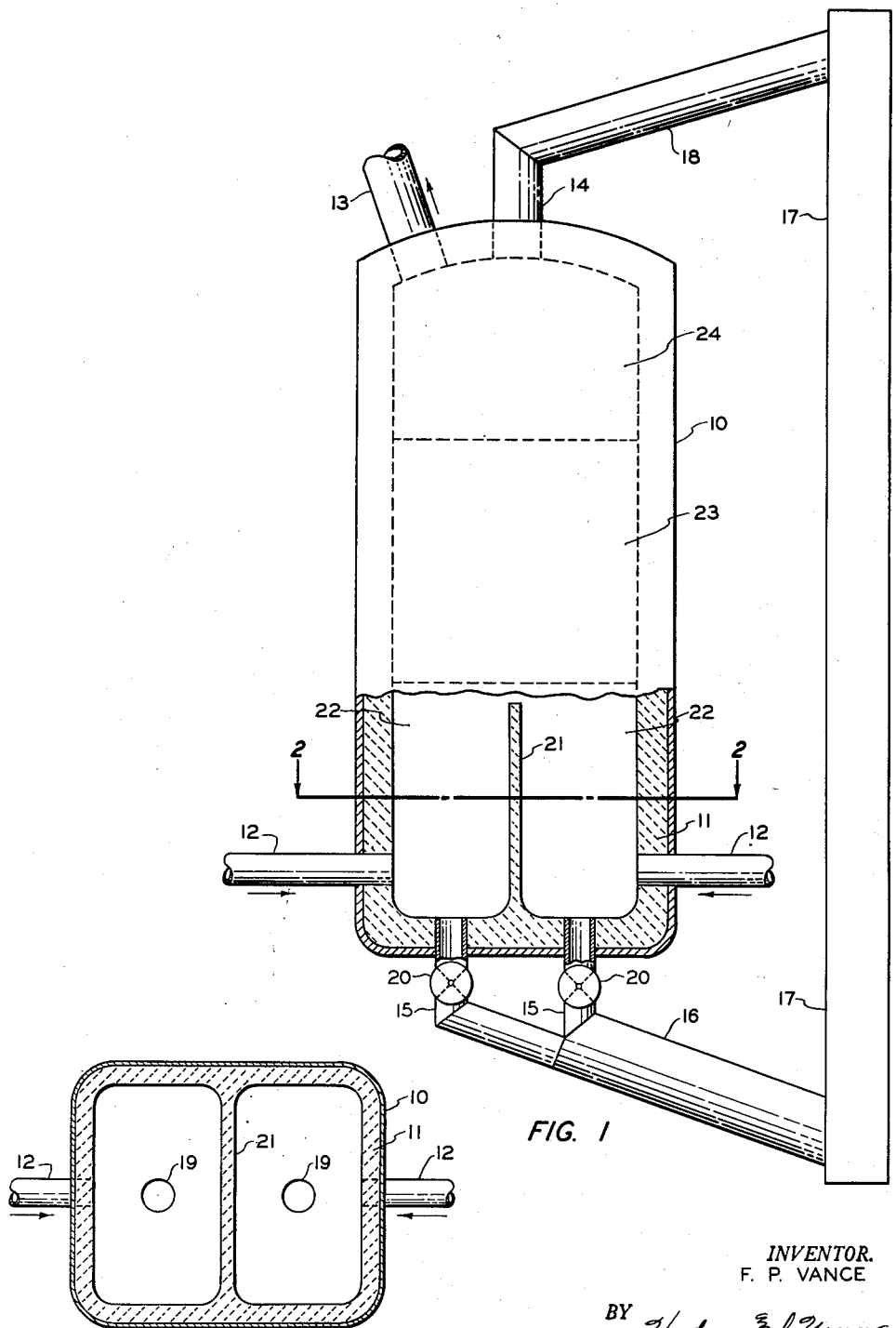

June 8, 1954     F. P. VANCE     2,680,676
GAS REACTION CHAMBER

Filed Jan. 4, 1949     2 Sheets-Sheet 1

INVENTOR.
F. P. VANCE
BY Hudson & Young
ATTORNEYS

June 8, 1954 F. P. VANCE 2,680,676
GAS REACTION CHAMBER
Filed Jan. 4, 1949 2 Sheets-Sheet 2

INVENTOR.
F. P. VANCE
BY *Hudson & Young*
ATTORNEYS

Patented June 8, 1954

2,680,676

UNITED STATES PATENT OFFICE 2,680,676

GAS REACTION CHAMBER

Frank P. Vance, Bartlesville, Okla., assignor to Phillips Petroleum Company, a corporation of Delaware Application January 4, 1949, Serial No. 69,084

6 Claims. (Cl. 23—284)

This invention relates to a process and apparatus for effecting gas phase chemical reactions in which a plurality of reactants are heated by contact with a gravitating fluent mass of hot heat-exchange material. A specific aspect of the invention pertains to a process and apparatus for the preparation of synthesis gas for Fischer synthesis.

Synthesis gas as referred to herein is essentially a mixture of carbon monoxide and hydrogen. It is used in the synthesis of organic compounds and its importance has greatly increased in recent years with the advent of the Fischer-Tropsch synthesis.

The invention is concerned with so-called "pebble heater" processes which entail gravitating a fluent mass of hot refractory pebbles in the form of ⅛ inch to 1 inch spheres through a refractory lined chamber and simultaneously passing a reactant or plurality of reactant gases upwardly through the gravitating mass of pebbles so as to heat the gases to reaction temperature and thereby effect the production of desired products. The usual technique is to introduce the reactants at ordinary or slightly elevated temperatures and preheat them in admixture in the lower section of the pebble heater chamber so as to bring them to reaction temperature and effect the reaction in the upper portion of the pebble heater chamber. In processes involving a plurality of reactants, it is frequently desirable to raise the temperature of the reactants to the region of reaction temperature without their being in contact with each other before mixing them in the reaction zone. It is found that this is the case with respect to the preparation of synthesis gas from hydrocarbon gases and air or oxygen with or without the addition of steam.

It is an object of this invention to provide an improved pebble heater process and apparatus for effecting chemical reactions involving a plurality of reactants with increased yield. It is also an object of the invention to provide a method and apparatus for separately preheating the reactants in a single chamber pebble heater type reactor. Other objects of the invention will become apparent from the accompanying disclosure.

While the invention is particularly adapted to the use of so-called "pebbles" which are small, hard, dense, refractory spheres, it also has application to any process utilizing any fluent particulate refractory material which withstands the temperatures involved and performs the heat exchange function required. Spherical pebbles are much more suitable than irregularly shaped contact material because of their better flow and low abrasion characteristics. Pebbles suitable for use are alumina, alumina-mullite, mullite, zirconia, periclase, and other combinations of refractory materials properly compacted and heat treated.

The apparatus of the invention is designed to permit the introduction of the reactants to the reaction zone at any desirable reaction temperature within the limits of the refractories available and permits the attainment of substantial economies in the process.

Figure 5:
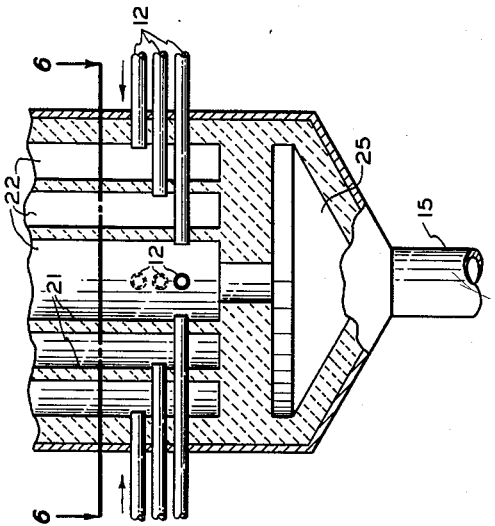
Figure 6:
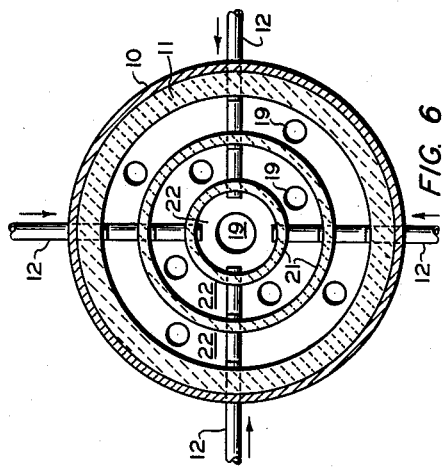
Figure 3:
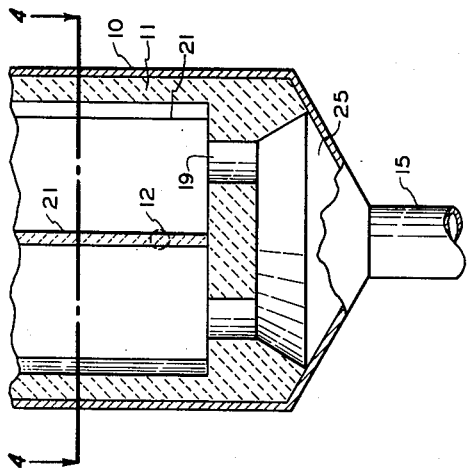
Figure 4:
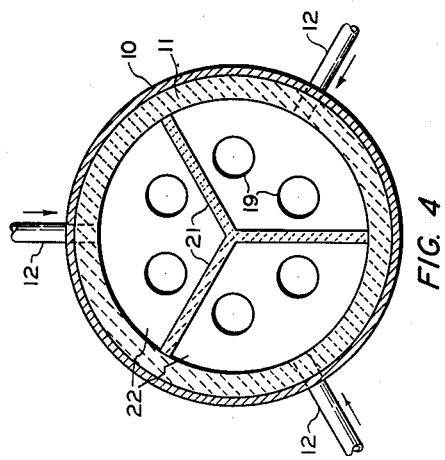

Referring to the drawings, Figure 1 is a diagrammatic elevational view, partly in section, of one modification of the invention. Figure 2 is a cross section of the apparatus of Figure 1 taken on the line 2—2. Figure 3 is a vertical section of the lower portion of another modification of a pebble chamber showing separate pebble passageways therethrough. Figure 4 is a horizontal section taken on the line 4—4 of Figure 3 showing the arrangement of the partitions with respect to the pebble outlets and gas inlets. Figure 5 is a vertical section of the lower portion of another modification of the pebble chamber of the invention. Figure 6 is a horizontal section taken on the line 6—6 of Figure 5.

Referring to Figure 1, 10 represents a vertical pebble chamber having a refractory lining 11, gas inlet conduits 12 and gas outlet conduit 13. Numeral 14 refers to a pebble inlet conduit and numeral 15 refers to pebble oulet conduits in the bottom of separate pebble passageways 22 formed by the partition 21 across the chamber and extending upwardly through the preheating section. Pebble flow control devices 20 in conduits 15 regulate the flow of pebbles through each pebble passageway. A pebble conduit or chute 16 connects with pebble conduits 15 and elevator 17 which may be a bucket screw or gas lift type elevator. Conduit or chute 18 connects the top of the elevator 17 with pebble inlet 14 for delivery of pebbles from the elevator to the pebble inlet to chamber 10. Section 22 serves as feed preheating sections wherein the reactants are separately heated. Section 23 represents the reaction section where the partial combustion of the hydrocarbon takes place as well as the reaction between the constituents of the feed which effect the production of carbon monoxide and hydrogen, while section 24 serves as a pebble preheating section where the sensible heat of the effluent gas is transmitted to the pebbles. Obviously, section 22 can readily be varied in height by increasing the height of partition 21 so as to control the pebble outlet temperature and the extent of preheat. The depth of section 24 may also be controlled by varying the length or height of vessel 10. The depth of section 23 will vary with feed composition, rate of flow, and other operating variables.

In Figure 2, the pebble outlets or openings are shown at 19. The other numerals in this figure designate parts already referred to in Figure 1.

Figures 3 and 4 show a specific arrangement of separate pebble passageways in the lower part of a pebble heater chamber. The partitions 21 divide the chamber into any convenient number of pebble passageways depending upon the number of reactants to be separately heated. Pebble outlets 19 are positioned in each of the pebble passageways to permit flow of the pebbles therefrom. The embodiment of Figure 3 shows a single pebble conduit 15 leading from the chamber to the elevator chute and a pebble collecting space 25 below the floor of the chamber which communicates with the individual pebble passageways through openings 19. Pebbles passing into compartment 25 are funneled into pebble outlet conduit 15.

Figures 5 and 6 show an embodiment involving annular pebble passageways in the lower section of a pebble chamber. These annular pebble passageways 22 are formed by concentric cylindrical partitions 21 and by the refractory lining 11 of chamber 10. The series of gas inlets 12 extend into the various compartments or pebble passageways for introduction of reactants thereto. Pebble outlets 19 communicate with a pebble collecting space 25 under the floor of the vessel so as to permit egress of pebbles through conduit 15.

The invention has application to any chemical process involving a plurality of reactants which is enhanced by separately preheating the reactants, or constituents of the feed stream, before mixing them and effecting the reaction. It has particular application to the production of synthesis gas by partial oxidation of hydrocarbons and has been found to effect considerable improvement in yield of such synthesis gas. In processes for the production of synthesis gas heretofore devised, the reaction has been carried out in combustion chambers with the introduction of the feed to the chamber preheated to the highest convenient temperature for the reaction. The preheating is effected in tube still-type furnaces and this is undesirable since it places rather severe limitations upon any furnace designed to preheat the feed. In the case of the hydrocarbon, the probability of cracking is great and the heating of pure oxygen to high temperatures and at elevated pressures is highly undesirable. Thus it is not possible in most cases to introduce the combined feed to the reaction chamber at a temperature higher than about 1000° F. Since high temperature equilibration is necessary in order to reduce residual hydrocarbon and other reactants to a minimum, the temperature normally utilized is in the order of 2500° F. This means that since the synthesis gas production reaction is only slightly exothermic, larger amounts of excess hydrocarbon and oxygen must be introduced with the feed to be burned completely, thereby providing the necessary exothermic heat required to realize this high temperature.

In its broader aspect, the apparatus of the invention is applicable to processes which are endothermic in character and which therefore require heating the pebbles in a separate chamber positioned above the reactor. In operation of this type, the pebbles are at their maximum temperature as they enter the reactor, continually lose heat as they gravitate therethrough, supply heat for the reaction in the reaction zone, and thereafter preheat the feed in the divided, lower section of the reactor.

The cross-sectional areas of the separate pebble passageways through the feed preheating section may be desirably proportioned in accordance with the heat requirements of each separate feed stream passed therethrough. The alternative to this method of regulating the temperature of preheat for the separate streams is to regulate the rate of flow of pebbles through each separate pebble passageway so as to provide the desired amount of heat-exchange therein. This can be done by flow control devices 20 in conduits 15 of Figure 1. By utilizing individual flow control devices 20 instead of a single flow-control device in chute 16 as in conventional pebble heater operation, the amount of heat-exchange in the various feed streams can be advantageously regulated so as to provide a wide range of preheating for each stream in accordance with its heat requirements. Flow control device 20 is a star valve but any pebble flow regulator or pebble feeder device may be used to regulate pebble flow through the pebble passageways.

Utilizing the preparation of synthesis gas as an illustration, in Figure 1 a suitable light hydrocarbon such as methane or natural gas is introduced through conduit 12 into either of pebble passageways 22 at atmospheric temperature, while a mixture of air and steam at only slightly elevated temperature is introduced through the opposite inlet 12 to pebble passageway 22. The reactants, including a regulated amount of $O_2$, are mixed above partition 21 in section 23 so as to burn sufficient hydrocarbon that the temperature of this zone is maintained between about 1800 and 2800° F. Since only partial oxidation of the hydrocarbon stream is effected in zone 23, the remaining hydrocarbon is reacted with steam to produce synthesis gas comprising CO and $H_2$. The hot synthesis gas passes upwardly through zone 24 and preheats the pebbles therein so that when the pebbles arrive at the lower portion of the reaction section 23 they are at their maximum temperature. The gravitating stream of pebbles is divided into two streams either side of the partition 21 as the pebbles pass into the preheating section. The relatively cool feed streams entering through lines 12 are preheated to any desired degree, but preferably to at least 1000° as they pass upwardly through the gravitating stream of pebbles. The pebble mass becomes cool in passing through preheating sections 22 and passes to elevator 17 through conduits 15 and chute 16 for elevation to conduit 18 and flow into the upper part of chamber 10 through inlet 14. The pebbles are then again heated by the rising synthesis gas which is taken off through conduit 13. Carbon dioxide may be introduced either in lieu of or in addition to steam depending upon the desired composition of the product gas.

In order to illustrate the invention, the following specific example is presented:

|  | Case I | | Case II | |
|---|---|---|---|---|
|  | Feed | Synthesis Gas | Feed | Synthesis Gas |
| $CH_4+$ | 1.0 |  | 1.0 |  |
| $H_2O$ | 1.25 | 1.45 | .62 | .53 |
| $O_2$ | .82 |  | .62 |  |
| CO |  | 1.03 |  | 1.17 |
| $H_2$ |  | 2.06 |  | 2.34 |
| $CO_2$ |  | .22 |  | .08 |
| Totals | 3.07 | 4.76 | 2.24 | 4.12 |
| Percent O+CO |  | 82.4 |  | 93.6 |
| Mols active S. G. / Mol $CH_4+$ |  | 3.09 |  | 3.51 |

Case I represents computed data in connection with the preparation of synthesis gas in a conventional combustion tube reactor at which the feed enters the reaction zone at 1000° F.

Case II represents computed data in the production of synthesis gas in a pebble heater apparatus of a design represented by Figure 1 in which the feed enters the reaction zone at 2000° F. The hydrocarbon feed to both processes (case I and case II) is taken such that the mol ratios of $H_2:C=1.80$ and the equilibration temperature is 2500° F.

It should be noted that on the basis of the same quantity of hydrocarbon, 3.50 moles of active synthesis gas are produced by operation according to the invention as compared with 3.09 moles obtained by conventional operation. This difference is achieved solely by increasing the effective temperature at which the reactants enter the reaction zone. The invention provides for virtually complete exchange of sensible heat between reactants and products in a single vessel.

Other advantages of the invention as applied to the preparation of synthesis gas lie in the fact that synthesis gas is produced at almost any desired temperature and at the pressure of the succeeding synthesis step. The high temperature zone is localized and the entire vessel is only slightly larger than a single combustion tube constructed for the same purpose, minus auxiliary heat exchangers.

Certain modifications of the invention will become apparent to those skilled in the art and the illustrative details disclosed are not to be construed as imposing unnecessary limitations on the invention. An illustration of a particularly advantageous modification of the invention is the constriction of heat exchange chamber 10 above partition 21 at the lower portion of the reaction section, so as to provide for more rapid and efficient mixing of reactants in this area. The constriction may be formed by shaping the refractory lining 11 so as to protrude into the chamber farther than the remainder of the refractory wall so as to form a ring type contour, for example.

I claim:

1. Heat-exchange apparatus for separately preheating a plurality of reactants in the lower section thereof and mixing and reacting same in an upper adjacent section thereof in contact with a gravitating stream of hot pebbles, which comprises an elongated upright enclosed cylindrical vessel having a downwardly extending conical bottom terminating in a pebble outlet; pebble inlet means and gas outlet means in the upper end of said vessel; a floor in the lower end of said vessel above said conical bottom forming a pebble collecting chamber between said floor and said bottom; at least one upright cylindrical partition axially disposed and extending upwardly from said floor into the lower section of said vessel so as to form therein a cylindrical chamber and at least one annular gas and pebble heat-exchange chamber surrounding said cylindrical chamber; a plurality of uniformly distributed openings in said floor connecting the lower ends of said annular and cylindrical pebble chambers with said pebble collecting chamber; a gas inlet conduit leading to the lower end of said cylindrical chamber; and a system of uniformly disposed gas inlet conduits independent of said gas inlet conduit and of each other leading to the lower section of each of said annular chambers.

2. Pebble heater apparatus for effecting chemical reaction between gases at elevated temperatures comprising an elongated upright cylindrical vessel having separate pebble inlet means and reaction product outlet means in the upper portion thereof and pebble outlet means in the lower portion thereof; at least one upright cylindrical partition axially disposed in the lower portion of said vessel forming an axial cylindrical pebble and gas heat-exchange chamber and at least one surrounding annular pebble and gas heat-exchange chamber; a pebble outlet conduit in the bottom of said vessel in communication with openings in the lower end of each of said chambers; and at least one conduit communicating with the lower portion of each of said chambers for introducing gas thereto, each of said conduits being separate and independent of the conduits for each of the other chambers so as to provide for the introduction of a different gas to each chamber.

3. The apparatus of claim 2 in combination with a pebble elevator communicating with said pebble outlet conduit at its lower extremity and with said pebble inlet means at its upper extremity, adapted for recycling pebbles from the lower portion of said vessel to the upper portion thereof.

4. Heat-exchange apparatus for separately preheating a plurality of reactants in the lower section thereof and mixing and reacting same in an upper adjacent section thereof in contact with a gravitating stream of hot pebbles, which comprises in combination an elongated upright enclosed cylindrical vessel having pebble inlet means and gas outlet means in the top and pebble outlet means in the bottom thereof; a plurality of upright cylindrical partitions axially disposed in the lower section of said vessel forming separate annular pebble and gas heat-exchange chambers surrounding a cylindrical pebble and gas heat-exchange chamber all of which chambers merge into a common mixing and reaction zone immediately above said partitions, the bottom of said chambers being in open communication with said pebble outlet; a gas inlet conduit leading to the lower end of said cylindrical chamber; and a plurality of gas inlet conduits leading to the lower end of each of said annular chambers, the conduits to each chamber being independent and distinct from those to each other chamber so as to provide for introduction of different gases into each chamber.

5. An elongated heat-exchange apparatus for separately preheating a plurality of reactants in the lower section thereof and mixing and reacting same in an upper adjacent section thereof in contact with a gravitating stream of hot pebbles, which comprises an elongated upright enclosed cylindrical vessel having a downwardly extending conical bottom terminating in a pebble outlet; pebble inlet means and gas outlet means in the upper end of said vessel; a floor in the lower end of said vessel above said conical bottom; at least one cylindrical partition axially disposed and extending upwardly from said floor into the lower section of said vessel so as to form a cylindrical and at least one annular gas and pebble heat-exchange chamber therein; a plurality of uniformly distributed conduits in said floor connecting the lower ends of said annular and cylindrical chambers with said pebble outlet; and a separate and independent system of symmetrically and uniformly disposed gas inlet conduits leading to the lower end of each of said chambers providing for uniform distribution of a different gas to each passageway.

6. Heat-exchange apparatus for separately preheating a plurality of reactants in the lower section thereof and mixing and reacting same in an upper adjacent section thereof in contact with a gravitating stream of hot pebbles, which comprises an elongated upright enclosed cylindrical vessel having a pebble outlet in its bottom and pebble inlet means and gas outlet means in its upper end; a floor in the lower end of said vessel spaced apart from said bottom, forming a pebble-collecting chamber between said floor and said bottom; a plurality of upright cylindrical partitions axially disposed and extending upwardly from said floor into the lower section of said vessel so as to form a cylindrical and a plurality of annular pebble passageways therein; a plurality of uniformly distributed conduits in said floor connecting the lower ends of said annular and cylindrical pebble passageways with said pebble-collecting chamber; a gas inlet conduit leading to the lower section of said cylindrical passageway; and a separate system of gas inlet conduits leading into the lower section of each of said annular passageways.

References Cited in the file of this patent

UNITED STATES PATENTS

| Number | Name | Date |
|---|---|---|
| 2,051,363 | Beekley | Aug. 18, 1936 |
| 2,394,814 | Snuggs | Feb. 12, 1946 |
| 2,399,450 | Ramseyer | Apr. 30, 1946 |
| 2,409,780 | Mekler | Oct. 22, 1946 |
| 2,415,755 | Ogorzaly et al. | Feb. 11, 1947 |
| 2,444,650 | Johnson et al. | July 6, 1948 |
| 2,486,627 | Arnold | Nov. 1, 1949 |
| 2,491,536 | Tyson | Dec. 20, 1949 |
| 2,548,026 | Kaasa | Apr. 10, 1951 |